Figure 1:
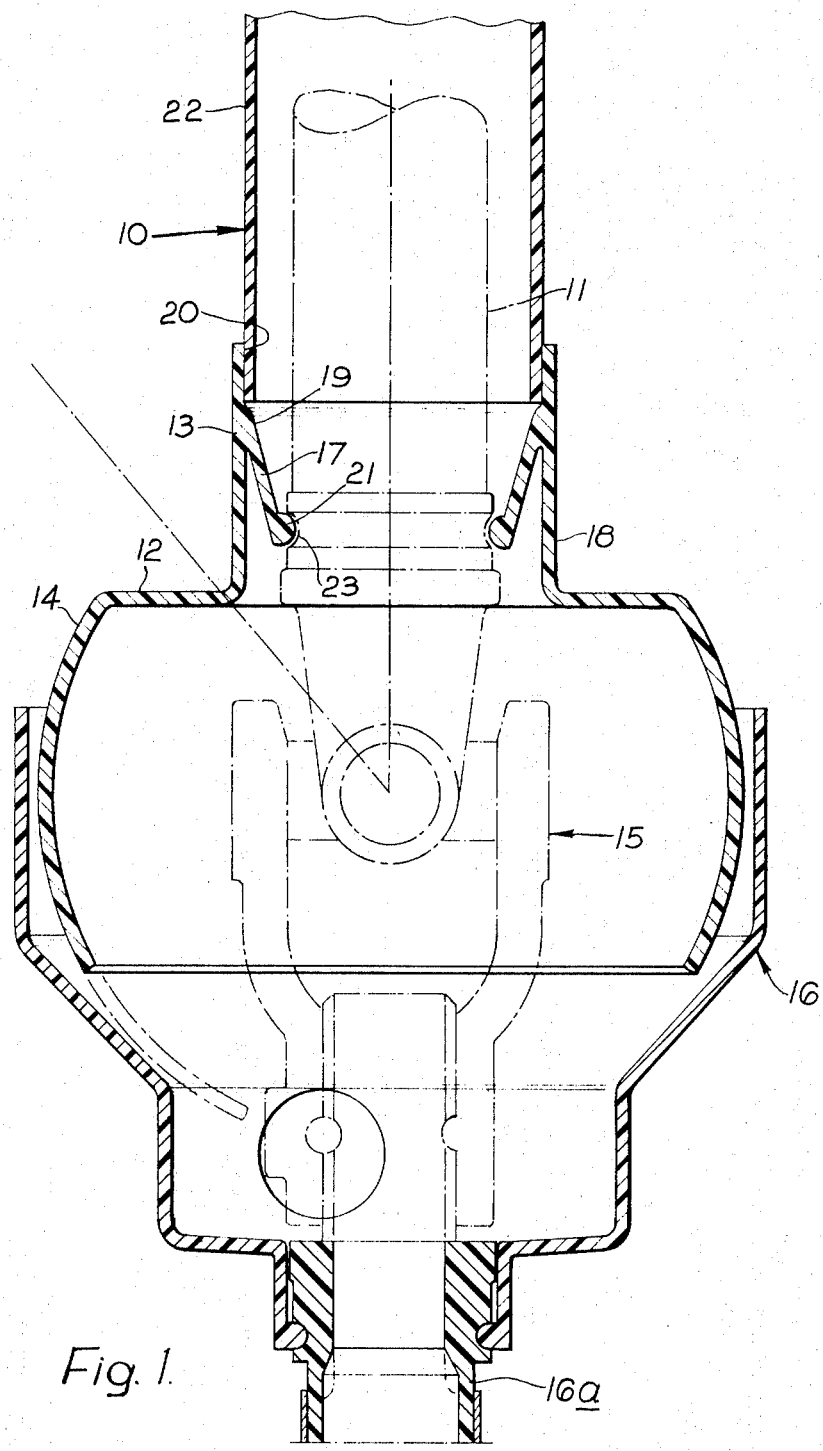

United States Patent [19]
Quirk

[11] 3,797,328
[45] Mar. 19, 1974

[54] SAFETY GUARDS

[75] Inventor: John Andrew Quirk, Burscough, England

[73] Assignee: Atkinson's of Clitheroe Limited, Clitheroe, England

[22] Filed: June 21, 1972

[21] Appl. No.: 264,730

[52] U.S. Cl. .............................. 74/609, 180/53 D
[51] Int. Cl. ............................................ F16p 1/04
[58] Field of Search ....... 74/609; 64/121; 180/53 D, 180/53 R

[56] References Cited
UNITED STATES PATENTS

| | | | |
|---|---|---|---|
| 1,475,876 | 11/1923 | Rasmussen | 74/609 X |
| 1,499,694 | 7/1924 | Rogers | 74/609 X |
| 1,527,428 | 2/1925 | Ebmeyer | 74/609 X |
| 3,386,312 | 6/1968 | Weasler | 74/609 |

FOREIGN PATENTS OR APPLICATIONS

| 1,201,573 | 6/1969 | Great Britain | 74/609 |
|---|---|---|---|

Primary Examiner—Benjamin W. Wyche
Assistant Examiner—F. D. Shoemaker
Attorney, Agent, or Firm—Norris & Bateman

[57] ABSTRACT

Rotatable shaft drive guard, particularly for power take-off shafts drive connecting a tractor or other prime mover to a trailed or mounted implement, comprises an end formation having a tubular part for surrounding an end of the shaft and a cone or ball shaped part for covering at least part of a coupling, said end formation, which is preferably formed from synthetic plastics material, includes an integral bearing means, typically in the form of a plurality of resilient fringes, for releasable engagement with a bearing formation at the end of the shaft while permitting relative rotation between the shaft and guard.

7 Claims, 2 Drawing Figures

SAFETY GUARDS

This invention relates to machinery drive guards of the kind adapted to enclose and be supported by a rotatable shaft while permitting relative rotation between the guard and shaft, and has particular but not exclusive application to power take-off drive assemblies (hereinafter referred to as "P.T.O. drive assemblies") comprising input and output shafts journalled respectively on a prime mover such as an agricultural tractor and on an implement or other appliance operatively mounted on or trailed by said prime mover, and an intermediate shaft, commonly of telescopic construction and having universal joints at each end, for coupling between said input and output shafts.

It is known to provide a guard comprising a pair of telescopic tubular members for surrounding the intermediate drive shaft, a pair of bell-shaped extensions as respective ends of the tubular members for at least partially enclosing the universal joints, and a pair of annular anti-friction bearing means for engagement with respective bearing formations provided on end portions of the intermediate shaft adjacent the joints to locate the guard on the shaft while permitting relative rotation therebetween. Examples of this type of guard are described in our British patent 920362.

The object of the present invention is to provide a guard of particularly simple construction whereby production is simplified and costs are reduced.

According to the invention a guard for a rotatable shaft comprising an end formation having a tubular neck portion for surrounding an end part of the shaft, and an increased diameter portion for at least partially enclosing a coupling operatively carried on said end of the shaft characterised by annular anti-friction bearing means integral with said end formation for operative location in a bearing formation of said end part of the shaft for axial location of the guard thereon while permitting relative rotation between the guard and shaft.

Figure 2:
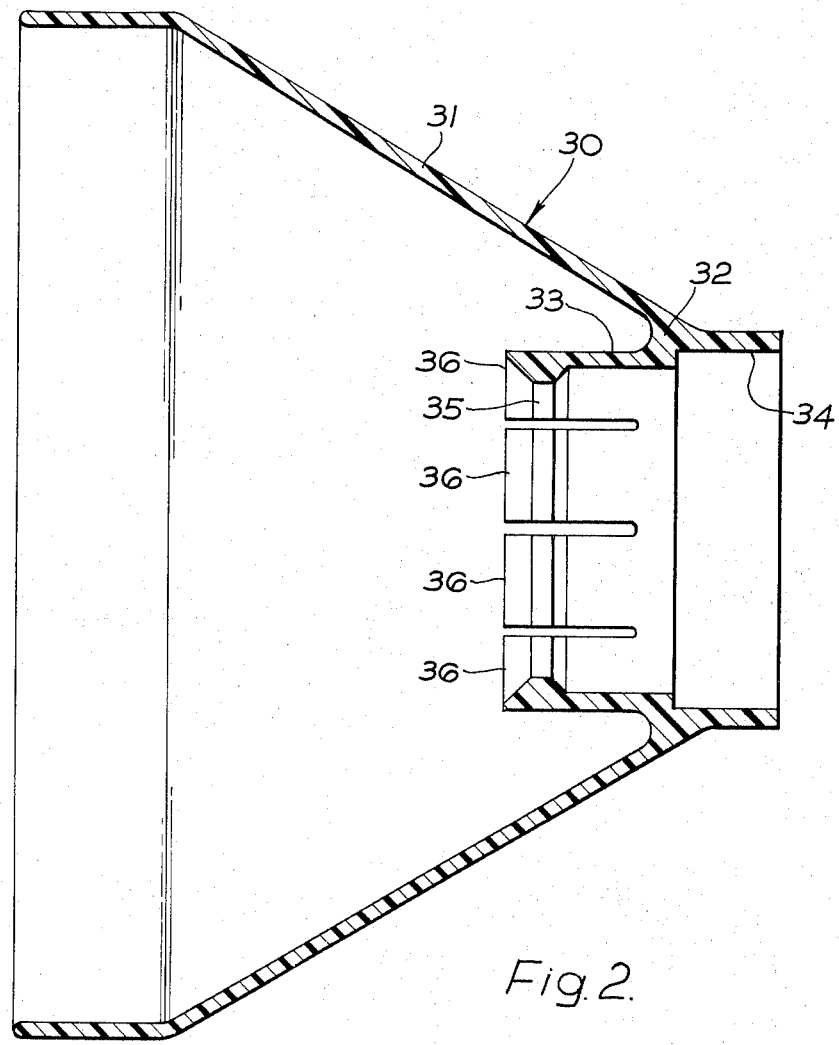

A preferred embodiment of the invention and a modified form thereof are now more particularly described with reference to the accompanying drawings wherein:

FIG. 1 is a sectional view of a guard mounted on an intermediate shaft of a power take-off drive assembly (part broken away); and FIG. 2 is a modified end formation for a guard of the type illustrated in FIG. 1.

In the first embodiment (FIG. 1) a guard 10 for an intermediate shaft 11 of a power take-off drive assembly comprises a bell-shaped end formation 12 consisting of a cylindrical neck portion 13 of sufficient diameter to give adequate clearance about the shaft itself and an increased diameter part-spherical portion 14 for enclosing a substantial part of a universal joint 15 at the end of shaft 11. Portion 14 is preferably of a diameter to be a close fit within an input or output drive shaft shield 16 carried on a mounting 16a of the kind described in our co-pending application Ser. No. 264,731 filed June 21, 1972 whereby when the shafts are coupled together with the shield and guard assembled, the universal joint 15 is completely enclosed throughout angular movement of the intermediate shaft 11 up to 40° out of line with the axis of the drive shaft.

The neck portion 13 is of constant external diameter but its interior includes an integral frusto-conical collar 17 which converges in the direction of portion 14 within an intermediate part 18 of neck 13, merging with said intermediate part in a thickened internal ridge 19 so that the free end of the neck defines an internal socket 20. The lesser diameter free end of collar 17 is thickened to provide an integral radially inwardly directed ridge 21 of semi-circular section and said free end is split axially at a plurality of positions around its circumference to define a plurality of finger-like formations which are resiliently deformable within part 18 of the neck.

The whole of end formation 12 including the annular bearing means consisting of the resilient fingers of collar 17 is an integral moulding of tough weather-resistant low-friction plastics material, for example "Rigidex" high density polythene.

The end socket 20 of the neck receives the end of a tubular member 22 for enclosing the shaft itself which tubular member is also formed from a like plastics material and can be permanently bonded in said socket by a friction welding process. Alternatively the parts can be connected for example by riveting.

A second guard member (not shown) consists of a like bell-shaped end formation with integral annular anti-friction bearing means and a second shaft-enclosing tube bonded or otherwise attached thereto, said second tube being a sliding fit within tube 22 of the first member for telescopic engagement therewith to accommodate the telescopic parts (not shown) of the intermediate shaft.

The guard members can be readily mounted on or dismounted from the respective parts of the telescopic shaft 11 by axial movement therealong, the resilient fingers of collar 17 snap-engaging in semi-circular peripheral grooves as at 23 which are provided as a standard part of the intermediate shafts adjacent to where the latter are attached to respective yokes of the universal joints.

The above construction is much easier to produce and assemble than known types of guard in which a collar incorporating annular antifriction bearing means has to be attached to a separate bell-shaped end formation and also has to have the tubular member attached thereto.

In a second embodiment of the invention (FIG. 2) a bell-shaped end formation 30 comprises a frusto-conical wall 31 for partially enclosing the universal joint of the shaft, the lesser diameter end of which merges with an intermediate part 32 of an integral neck 33 which is generally cylindrical in shape. The free end of the neck projecting to the exterior of the cone-shape has an increased internal diameter to define a socket 34 within which a tubular member (not shown) of the guard is riveted or bonded as by friction welding, and the opposite end portion of the cylindrical neck lying within cone 31 includes an internal radially inwardly directed ridge 35 for engagement with a peripheral bearing groove of the shaft, and is split axially to form a plurality of resilient, fingers 36 as previously described.

In order to strengthen the resilient loading of the fingers of either type of guard a spring wire circlip may be mounted in a groove defined by the exterior of the fingers but it has been found in practice that the characteristics of the plastics material employed and the dimensions of the fingers can be chosen to supply sufficient resilience without additional aid.

Apart from being readily mounted on and removed from the shaft e.g. for lubrication or maintenance of the universal joints, the above described form of guard provides an additional safety feature in that if the intermediate shaft should be moved excessively out of line with the drive shafts during operation so as to cause the guard to be fouled by the latter shafts and/or the couplings etc., it will be pushed axially out of place on the intermediate shaft by forcing the fingers to disengage from the groove thereof. If this occurs the guard can readily be replaced in position by the operator and substantial damage to the guard by such fouling is unlikely.

I claim:

1. A guard for a rotatable shaft having an end part formed with bearing means in the form of an annular groove comprising an end formation having a tubular neck portion for surrounding said end part of the shaft and increased diameter portion for at least partially enclosing a coupling operatively carried on said end part of the shaft, said end formation including integral annular anti-friction bearing means in the form of integral radially inwardly directed ridge means at the free end of a collar integral with said end formation and enclosed therewithin, said free end being radially spaced from an outer wall of the end formation and being split axially to form a plurality of resilient finger-like formations free to flex within the end formation for snap engagement with said annular groove whereby said bearing means serves for axial location of the guard upon the shaft while permitting relative rotation between the guard and shaft.

2. A guard according to claim 1 characterised in that said collar is frusto-conical and its lesser diameter end is split axially to form the finger-like formations.

3. A guard according to claim 2 characterised in that said collar is cylindrical and lies within a frusto-conical increased diameter portion of the end formation.

4. A guard according to claim 1 characterised by a tubular member for enclosing a further part of the shaft and having one end received in a socket defined by the neck portion of the end formation.

5. A guard according to claim 4 characterised in that both the end formation and the tubular member are formed from synthetic plastics material and are secured together by friction welding.

6. A guard according to claim 2, characterized in that the larger diameter end of said collar is integrally joined to the inner periphery of said neck portion intermediate the ends thereof and said collar extends coaxially of said neck portion away from the open outer end of said neck portion.

7. A guard according to claim 1 wherein said collar is integrally joined at one end to the interior of said guard at the juncture of said neck and increased diameter portions and extends coaxially away from the open outer end of said neck portion.

* * * * *

UNITED STATES PATENT OFFICE
CERTIFICATE OF CORRECTION

Patent No. __3,797,328__          Dated __March 19, 1974__

Inventor(s) __John Andrew Quirk__

It is certified that error appears in the above-identified patent and that said Letters Patent are hereby corrected as shown below:

On the first page the foreign application priority data was omitted. Please insert the following after the application number:

Foreign Application Priority Data

July 2, 1971 Great Britain ................ 31055

Signed and sealed this 10th day of September 1974.

(SEAL)
Attest:

McCOY M. GIBSON, JR.          C. MARSHALL DANN
Attesting Officer              Commissioner of Patents